United States Patent

Bowman et al.

Patent Number: 5,287,378
Date of Patent: Feb. 15, 1994

[54] HOLMIUM QUASI-TWO LEVEL LASER

[75] Inventors: Steven R. Bowman, Davidsonville, Md.; Barry J. Feldman, Arlington, Va.

[73] Assignee: The United States of America as represented by the Secretary of the Navy, Washington, D.C.

[21] Appl. No.: 998,347

[22] Filed: Dec. 30, 1992

[51] Int. Cl.⁵ ............................................. H01S 3/14
[52] U.S. Cl. ..................................... 372/68; 372/41
[58] Field of Search ........................... 372/68, 41, 39

[56] References Cited

U.S. PATENT DOCUMENTS 4,965,803 10/1990 Esterowitz ............................ 372/39
5,038,353 8/1991 Esterowitz ............................ 372/41

OTHER PUBLICATIONS

Dixon et al.; "Low-Threshold 2 μm Holmium Laser Excited by Non-Radioactive Energy Transfer from $Fe^{3+}$ in YAG"; Opt. Lett., vol. 17(24); Dec. 15, 1992.

Primary Examiner—Léon Scott, Jr.
Attorney, Agent, or Firm—Thomas E. McDonnell; George Jameson

[57] ABSTRACT

The directly pumped holmium (Ho) quasi-two level laser of the invention comprises a directly pumped holmium laser having a host material doped with an amount of holmium ions sufficient to produce an output laser emission at a wavelength of about 2.1 μm when the holmium laser is pumped by a pump beam at a wavelength of about 2 μm and a pumping laser for producing the pump beam. In an exemplary embodiment, the pumping laser comprises a Cr,Tm:YAG laser pumped by a flashlamp.

21 Claims, 3 Drawing Sheets

HOLMIUM QUASI-TWO LEVEL LASER

CROSS-REFERENCE TO RELATED APPLICATION

This application is related to co-pending, commonly assigned U.S. patent application Ser. No. 7/998,348, filed concurrently with the present application on Dec. 30, 1992 by Leon Esterowitz and Robert S. Stoneman and entitled "INTRACAVITY-PUMPED 2.1 μm $Ho^{3+}$:YAG LASER".

BACKGROUND OF THE INVENTION

Field of the Invention

The present invention relates generally to a solid state lasers and, more specifically, to a laser system comprising a directly pumped holmium laser.

Discussion of the Related Art

In solid state lasers, a light emitting element is added as a dopant to a host compound that serves as a crystalline or amorphous host. One of the most common host compounds is a crystal comprising a mixture of yttrium, aluminum and garnet, which is generally referred to as YAG crystal. The characteristics of the solid-state laser depend on the dopant and the crystalline compounds used therein. The best light emitting dopant materials include chromium, neodymium, erbium, holmium, thulium and titanium. Absorption can be at a narrow or broad range of wavelengths depending on the transitions involved. Laser operation using the Holmium $^5I_7$ to $^5I_8$ transition is provided at wavelengths near 2.1 μm in many different host crystals. Unlike the more common rare earth lasers doped with neodymium, trivalent holmium has few absorption bands for pumping in the visible and near-IR (infrared) spectrum. Consequently, laser performance using broad spectral emission pump sources has been poor except where additional sensitizer ions have been used.

Thulium (Tm) has proven to be an effective sensitizer for holmium (Ho) at densities greater than $4 \times 10^{20} cm^{-3}$. High efficiency has been achieved via a Tm/Tm cross-relaxation interactions which generate two excited state ions per pumped photon. For further information on Tm/Tm cross-relaxation interactions, reference is made to B. M. Antipenko et al., "Spectroscopy of YAG:CrTmHo Laser Crystals," Opt. Spectrosc. (USSR), Vol. 64 pp. 772–774, 1988; G. Armagan et al., "Spectroscopic Characterization of Dynamic Processes for Tm,Ho:YAG Lasers," Technical Digest of Topical Meting on Advanced Solid State Lasers, pp. 142–144, 1990; and G. J. Quarles et al., "Efficient Room Temperature Operation of $Cr^{3+}$ Sensitized, Flashlamp-pumped, 2 μm Lasers," Optical and Quantum Electronics, Vol. Jul. 22, 1990.

Thulium sensitized holmium laser materials have proven to be quite useful but have several disadvantages. For example, the near energy resonance between the Tm $^3F_4$ and Ho $^5I_7$ results in incomplete energy transfer from the sensitizer ions. At room temperature with otherwise optimal densities of sensitizer, transfer of only approximately 60% of the stored excitation density to holmium ions before laser emission is possible. This incomplete transfer proportionally increases the already high lasing thresholds associated with holmium.

Further, the interaction of Tm $^3F_4$ and Ho $^5I_7$ metastable ions create a detrimental upconversion loss process that severely limits energy storage lifetimes and small signal gains. For more information on upconversion loss processes, reference is made to Tso Yee Fan et al., "Spectroscopy and Diode Laser-Pumped Operation of Tm,Ho:YAG," IEEE J. Quantum Electron. Vol. 24, pp. 924–933, 1988; G. Kintz et al., "Upconversion Coefficient measurement in $Tm^{3+},Ho^{3+}$:YAG at Room Temperature," Proceedings of the International Conference on Lasers '87, pp. 398–403, 1987; Thomas J. Kane et al., "Diode-Pumped Single Frequency Lasers and Q Switched Lasers using Tm:YAG and Tm,Ho:YAG," Topical Meeting on Advanced Solid State Lasers, pp. 133–135, 1990; and Bowman et al., "Laser Spectral Properties of Cr,Tm,Ho:YAG at 2.1 μm," IEEE J. Quantum Electron., vol. 27, pp. 2142–2149, 1991.

In addition, the short pulse performance of Tm/Ho lasers are limited by the upconversion loss process and the relatively slow (about 20 μsec) energy transfer from Tm $^3F_4$ and Ho $^5I_7$.

Finally, the thermal loading of the Tm/Ho laser material is increased by the incomplete energy transfer and upconversion losses, thereby limiting the utility of such material for average power production.

Several U.S. Patents disclose lasers which are pumped to achieve inversions. For example, U.S. Pat. No. 4,321,559 (Esterowitz et al.) discloses a solid state Ho:YLF laser which is pumped by a flashlamp or a doubled ND laser to populate the $^5S_2$ manifold. Inversion is achieved between the $^5I_7$ and the $^5I_8$ at a 2.06 μm wavelength.

U.S. Pat. No. 4,807,240 (Goldstone) discloses a beam combination device for optically pumping lasers by creating population inversions.

U.S. Pat. No. 4,965,803 (Esterowitz et al.) discloses a Tm:YAG laser which is pumped by a CW pump beam for producing laser pulses having 2 μm wavelength.

U.S. Pat. No. 4,974,230 (Hemmati) patent discloses a Ho:YLF laser, including a Tm sensitizer, which is pumped by a semiconductor laser diode array for producing a radiation having a 2.1 μm wavelength.

U.S. Pat. No. 4,969,154 (Esterowitz et al.) discloses a solid state laser for producing an emission of 2 μm wavelength. The laser comprises a host crystal which is doped with $CR^{3+}$ and $Tm^{3+}$ and a flashlamp for pumping the host crystal.

U.S. Pat. No. 5,036,520 (Bowman et al.) discloses a laser system comprising a holmium laser which is pumped by a neodymium laser for generating an output laser beam of 3 μm wavelength.

U.S. Pat. No. 5,038,353 (Esterowitz et al.) discloses a solid state laser for producing an emission. The laser comprises a host crystal which is doped with $Ho^{3+}$ and $Tm^{3+}$ and a laser diode for pumping the host crystal.

U.S. Pat. No. 5,099,486 (Acharekar et al.)patent discloses a Ho:YAG laser which is frequency stabilized by a seed laser driver and a Q-switch correcting timing differences by adjusting the optical path length.

U.S. Pat. No. 5,088,103 (Esterowitz et al.) discloses a solid state laser for producing an emission. The laser comprises a host crystal which is doped with $Ho^{3+}$ and $Tm^{3+}$ and a flashlamp for pumping the host crystal.

U.S. Pat. No. 5,107,513 (Sagie et al.) discloses a holmium laser which utilizes pumping lamps enclosed therein.

U.S. Pat. No. 5,070,507 (Anthon) discloses a laser system which utilizes a neodymium laser functioning at a frequency of 1.1 μm to pump a holmium laser to produce an output pulse having frequency of 3 μm.

U.S. Pat. No. 4,956,843 (Akhavan-Leilabady et al.) discloses a two level laser system comprising two solid state lasers which are arranged in series and optically pumped by a light emitting diode. The lasers are selected from the group comprising neodymium doped YAG, neodymium doped YALO, neodymium doped YLF, and neodymium doped GSGG.

Other patents which disclose two-level lasers include U.S. Pat. No. 4,933,947 (Anthon et al.) which discloses a device for eliminating amplitude fluctuations. The device comprises an optical cavity for producing optical radiation at a first frequency, a solid lasant material disposed in the cavity, a means for eliminating spacial hole burning, a nonlinear optical means for converting the optical radiation of a first frequency to a second frequency, and a temperature controller.

U.S. Pat. No. 4,884,277 (Anthon et al.) discloses a laser comprising a laser cavity, a lasant material for emitting laser light and disposed in the laser cavity, two non-linear optical crystals in communication with the lasant material and two mirrors which define the laser cavity.

U.S. Pat. No. 4,879,723 (Dixon et al.) discloses an optical mixer which utilizes a laser diode for generating a first output radiation, a laser for generating a second output radiation, and a bending mirror for combining the two laser lights to create a third output radiation.

SUMMARY OF THE INVENTION

According to the invention, a directly pumped holmium quasi-two level laser is provided which affords a number of important advantages over sensitized holmium lasers. These advantages include reducing the thermal loading of the laser medium, reducing the up-conversion losses, increasing the short pulse extraction efficiency, reducing the sensitivity of the gain provided to temperature effects, and increasing the flexibility in the selection of holmium ion concentrations and holmium host materials.

In accordance with the invention, a laser system or device is provided which comprises a holmium laser having an output wavelength of 2.1 μm and a further, pumping laser having an wavelength of 2.0 μm for directly pumping the holmium laser.

In a preferred embodiment of the invention, the pumping comprises a 2.0 μm thulium laser and the Thulium $^3F_4$ to $^3H_6$ transition is used to provide direct optical pumping of the Holmium $^5I_7$ level of the holmium laser, although other pump sources such as 2 μm laser diodes can be used. In an advantageous implementation of the preferred embodiment, the pumping laser comprises a YAG crystal containing thulium and chromium. Preferably, the 2 μm laser is doped with thulium at a concentration of approximately $8 \times 10^{20}$ cm$^{-3}$ and chromium at a concentration of approximately $7 \times 10^{19}$ cm$^{-3}$. In one preferred embodiment, the pumping laser includes a pulsed light source for the pumping YAG crystal. Advantageously, the pulsed light source comprises a flashlamp although other pumps can be used.

In a preferred embodiment, the laser comprises a Ho:YAG crystal. Advantageously, the Ho:YAG crystal is disposed inside a high Q thulium cavity. The holium laser preferably comprises a host material doped with holmium ions at a concentration of approximately $5 \times 10^{19}$ cm$^{-3}$.

Other features and advantages of the invention will be set forth in, or apparent from, the following detailed description of the preferred embodiment of the invention.

DETAILED DESCRIPTION OF THE PREFERRED EMBODIMENTS

Figure 1:
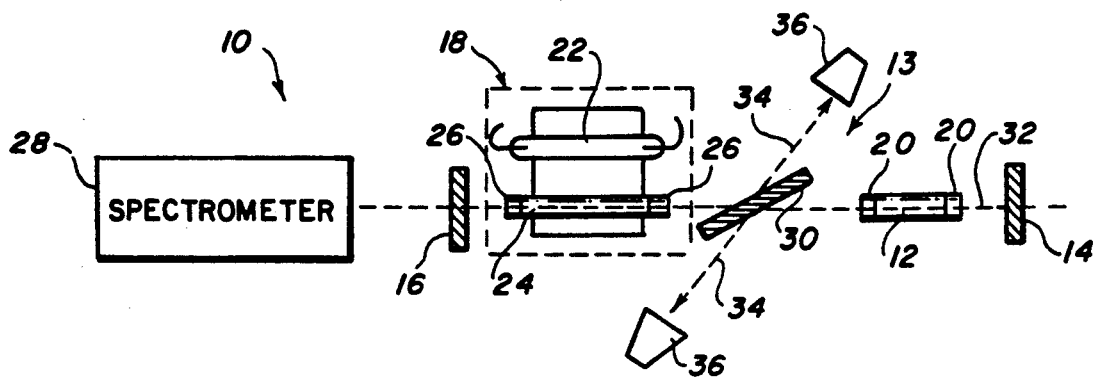
FIG. 1 is a block diagram of a test setup for testing a solid state laser device constructed in accordance with a preferred embodiment of the invention, illustrating the basic units of that laser device schematically.

Referring to FIG. 1, an experimental laser setup is shown for demonstrating the pumping of a two level holmium laser. The laser setup, which is generally denoted 10, includes a laser crystal 12 which is one basic unit of the laser device of the invention and which is doped with holmium ions at a concentration of $5 \times 10^{19}$ cm$^{-3}$ and has anti-reflective (AR) coated end faces 20. As discussed above, the most common host material is a YAG crystal, and this host material is used in a preferred embodiment of the invention. However, it should be noted that other host materials, such as glass, YSAG (yttrium scandium aluminum garnet), YSGG (yttrium scandium gallium garnet), YGG (yttrium gallium garnet), GGG (gadolinium gallium garnet), GSAG (gadolinium scandium aluminum garnet), GSGG (gadolinium scandium gallium garnet), LLGG (lanthanum lutetium gallium garnet) and YLF (yttrium lithium fluoride), can also be used as long as the host material is doped with holmium ions. In a preferred embodiment, the laser crystal 12 is a Ho:YAG laser fabricated as a $5 \times 35$ mm rod. The relatively low holmium density set forth above produces a single pass absorption of only 25% when excited by a pumping laser having an output wavelength of 2.017 μm. The laser crystal 12 is disposed in a high Q thulium optical cavity 13, which is defined in part by a flat partially reflective mirror 14 (which also operates as an output coupler) and a concave totally reflective mirror 16 disposed at respective sides of crystal 12. An optical path 32 is defined by a straight line between mirrors 14 and 16.

A pumping laser 18 is disposed between reflective mirror 16 and laser crystal 12. By placing the lasing material 12 inside of the optical cavity 13, the coupling of pump radiation between the pumping laser 18 and the Ho:YAG laser crystal 12 is enhanced. Additionally, the optical coupling between the pumping laser 18 and the Ho:YAG laser crystal 12 is simplified.

Pumping laser 18 comprises a flashlamp 22 and an optically coupled Cr,Tm:YAG laser crystal 24 which is doped with concentrations of thulium and chromium at $8 \times 10^{20}$ cm$^{-3}$ and $7 \times 10^{19}$ cm$^{-3}$, respectively. The flashlamp 22 produces 500 μsec FWHM (full width half maximum) pulses for pumping laser crystal 24 in a single lamp, diffuse close-coupled cavity. It should be noted that the flashlamp 22 could be replaced with an arc lamp to provide a continuous wave (CW) 2 μm pump source. It should be further noted that although a flashlamp 22 is used as the pump source in the embodiment illustrated in FIG. 1, other pump arrangements or sources can be used and that, for example, 2 μm laser diodes can be employed to provide direct pumping of the holmium 2.1 transition. The Cr,Tm:YAG crystal 24, which has an output wavelength of 2.017 μm, was fabricated in an exemplary embodiment as a 5×66.5 mm rod with a polished barrel and AR-coated end faces 26. With the holmium laser 12 inside the cavity 13 the threshold electrical pump energy for the thulium laser 18 is 92J. Laser emission at a 2.120 μm transition is 94 J, just above the thulium threshold electrical pump energy. This close correspondence between the threshold levels indicate the effectiveness of the intracavity radiative energy transfer to the holmium ions in the Ho:YAG laser 12.

It should be noted that the Cr,Tm:YAG laser 24 may be operated in either a CW (continuous wave) or long pulse mode to prevent the Tm/Tm up-conversion losses from impairing efficiency. Additionally, the Cr,Tm:YAG laser 24 may be operated in the multiple transverse mode and thus strict mode control is unnecessary. The lack of strict control allows for full utilization of the Tm laser volume and reduces diffractive cavity losses. Recent experiments show that eliminating strict control is an important step in achieving high efficiency especially at higher average power levels. Finally, since the Cr,Tm:YAG laser 24 need not be coherent, laser 18 may consist of many separate resonators combined through a temporal or spacial overlap and thus allow average power scaling well beyond that capable of a single resonator.

In the experimental setup shown in FIG. 1, an optional spectrometer 28 is provided to allow for the determination of the wavelength of the two level holmium laser. Additionally, an optional deflection mirror 30 is provided between the laser crystal 12 and the pumping laser 18 for partially deflecting an optical signal in optical path 32 to secondary optical paths 34 which terminate at energy monitors 36. Monitors 36 are used to measure the power levels of the two level holmium laser. Further, an optional dichroic output coupler (not shown) can be provided between the Ho:YAG laser 12 and the Cr,Tm:YAG laser 18 for increasing the overall efficiency and gain.

Figure 2:
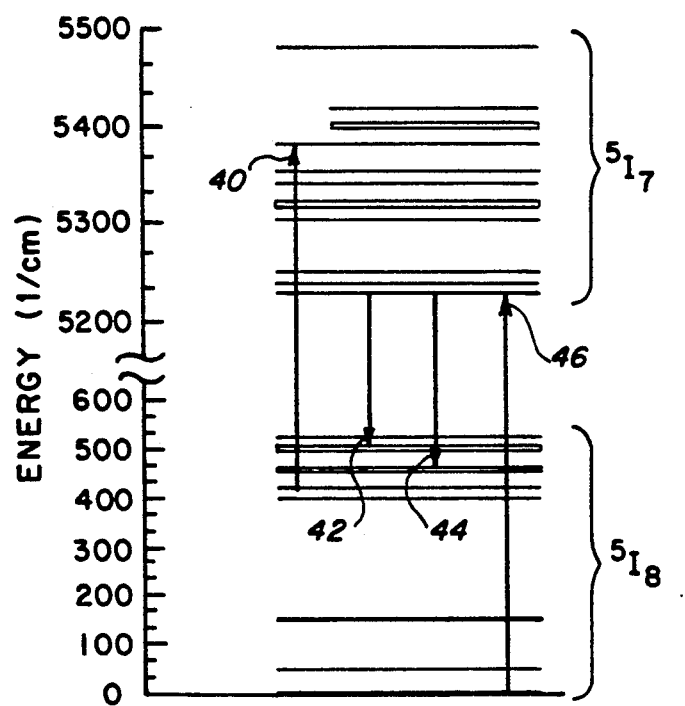
FIG. 2 is an energy level diagram which illustrates the pumping transitions for the laser device of FIG. 1.

The theory of Ho 2.1 μm lasers which utilize Tm pumping are much the same as other Ho lasers without sensitization except for the effects of pump depletion. Since the pumping scheme used by the two level holmium laser of the invention directly populates the holmium first excited manifold, pump absorption and extractable laser energy are intimately related. Referring to FIG. 2, an energy level diagram which illustrates the pumping transitions for the two level holmium laser of the invention is illustrated. As illustrated, the absorption of energy of the 2.017 μm Cr,Tm:YAG laser 24 causes a transition in the holmium ions of the Ho:YAG laser 12 from the $^5I_8$ to the $^5I_7$ state. This transition is indicated in FIG. 2 by an upwardly pointing arrow 40. This absorption in turn causes a transition at wavelengths of 2.120 μm and 2.090 μm which are illustrated by downwardly pointing arrows 42 and 44 respectively. These reductions in energy levels of the holmium ions generate the lasing effect of the Ho:YAG laser 12. As may also be seen in FIG. 2, a suggested optimal transition would occur between the $^5I_8$ and $^5I_7$ states at 1.91 μm and is illustrated by upwardly pointing arrow 46.

A simple steady state analysis of the pump saturation and laser gain equations reveals that the maximum fraction of the absorbed energy that can be usefully extracted is given by the equation:

$$\eta_{max} = \left[\frac{R}{(1+R)}\right]\left[\frac{\nu_{laser}}{\nu_{pump}}\right]\left[1 - \exp\left[-\frac{h(\nu_{pump}-\nu_{laser})}{kT}\right]\right] \quad (1)$$

where:

$$R = \frac{f_{upper}}{f_{lower}}, \quad f_{upper} = \frac{\exp\left[\frac{-\Delta E_{upper,laser}}{kT}\right]}{\sum_i^{5I_7} \exp\left[\frac{-\Delta E_i}{kT}\right]},$$

and $$f_{lower} = \frac{\exp\left[\frac{-\Delta E_{lower,laser}}{kT}\right]}{\sum_i^{5I_8} \exp\left[\frac{-\Delta E_i}{kT}\right]}.$$

Since the Boltzmann factors $f_{upper}$ and $f_{lower}$ depend on the host crystal and the operating temperature, the maximum extraction efficiency is determined principally by the quantum defect thermal fraction, $$\frac{h\Delta\nu}{kT}.$$

The details of this pumping scheme are host crystal and temperature dependent, as is evident from considering YAG crystals at room temperature. In Ho:YAG crystals at room temperature the Boltzmann factors $f_{upper}$ and $f_{lower}$ are 0.108 and 0.016 respectively. With Ho lasers operating at a frequency of 2.097 μm and the Tm laser operating at 2.014 μm, the quantum defect thermal fraction is 0.95. In this case, the equation above predicts a maximum extractable energy fraction of 51%.

In order to effectively absorb the energy from the pumping laser 18, the product of the length of the laser crystal 12 and the holmium (Ho) density must be optimal. In the Ho:YAG laser the absorption cross-section at 2.014 μm is $1.2 \times 10^{-21}$ cm². Therefore a 10 cm 1.0% Ho:YAG crystal will absorb 75%-85% of the energy from a Tm:YAG laser until pump saturation occurs. Multiple pass absorption may be used to increase absorption and energy deposition uniformity.

A principal advantage of the pumping scheme of the invention is its reduction in the thermal loading of the Ho host laser material. The high "J" value, Ho levels, and the large Stark splitting permit direct pumping of the $^5I_7$ manifold. Nonradiative decay of the Ho $^5I_7$ ion energy levels should be dominated by radiative decay, even in the absence of stimulated emission. The result is a laser medium in which very little of the absorbed energy is transformed into heat. With the example a room temperature optimized YAG, only 4%-5% of the absorbed energy should produce heat. No other practical laser medium exhibits such small thermal loading factors. By comparison, most laser materials generate more heat than laser light.

Several important consequences result from such a low thermal loading. First, there is reduction in thermal beam distortions and higher obtainable average powers. Second, increased laser mode volumes and higher limits on single shot energy are obtainable. Finally, more efficient operation at low temperatures is possible.

Figure 3:
FIG. 3 is an output waveform trace of the laser of FIG. 1.

Turning now to FIG. 3, a waveform trace of the quasi-two level laser of the invention is illustrated. More specifically, curve 48 indicates a typical waveform trace for the quasi-two level laser of the invention for the embodiment described above, i.e., the Cr,Tm:YAG laser 24 at 2.017 μm and the Ho:YAG laser 12 at 2.120 μm, while curve 50 indicates the waveform trace for the Ho:YAG laser only. The time scale is 20 μsec per division. As is indicated by the traces 48 and 50, the initial pulses from the thulium laser 24 transfer energy to the holmium crystal 12, but once the laser 12 reaches the threshold level, the increased absorption losses cause the pumping laser 18 to abruptly terminate. In free running operation, the laser of the invention, i.e., the combined resonator, has been found to oscillate between the thulium and holmium laser transitions discussed above.

As mentioned earlier, Tm sensitized Ho (Tm,Ho:YAG) lasers have been shown to suffer from a detrimental up-conversion process. Experiments have shown that under normal operating conditions energy storage lifetimes can drop to as little as ⅓ of their low power values. This seriously limits the application of these materials for pulsed mode operation. Recent fluorescence experiments indicate that up-conversion is not a serious problem in the singly doped Ho crystals used in the quasi-two level holmium laser of the invention.

Figure 4:
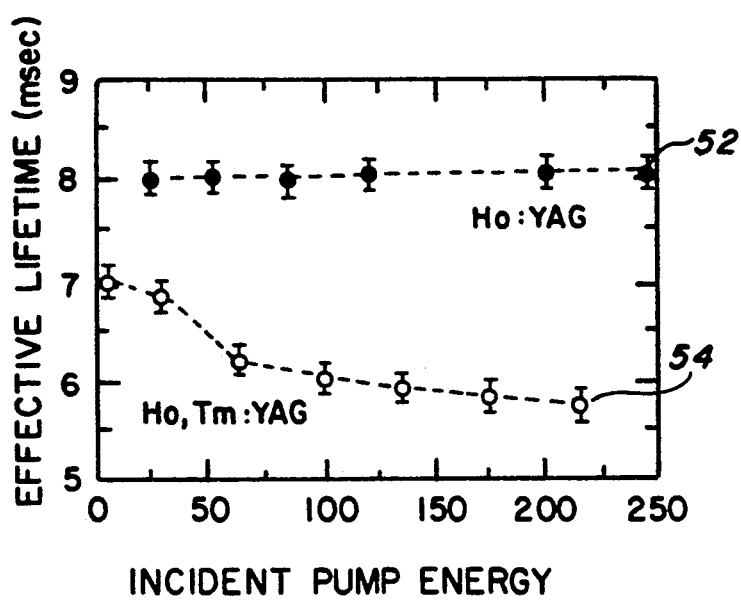
FIG. 4 is a graph illustrating the effective fluorescence lifetime of the laser device of FIG. 1.

Referring to FIG. 4, the effective lifetimes of the 2.12 μm fluorescence from a Ho:YAG laser (with $N = 5.3 \times 10^{19}$ cm$^{-3}$) and a Ho,Tm:YAG laser (with $N_{Ho} = 5.3 \times 10^{19}$ cm$^{-3}$ and $N_{Tm} = 8.0 \times 10^{20}$ cm$^{-3}$) are indicated by curves 52 and 54 respectively. The data for curves 52 and 54 were generated from fluorescence experiments using a Cr,Tm:YAG pumping laser operating with a short laser pulse, i.e., at a wavelength of 2.097 μm to compare upconversion losses in Ho:YAG and Tm,Ho:YAG lasers. Fluorescence decay at a wavelength of 2.12 μm was monitored for 50 msec after pump termination. The lifetimes shown are the best exponential fit to the first 5 m sec of the decay waveforms. These measurements revealed that singly doped Ho materials retain energy storage lifetimes consistent with their fluorescence lifetimes (~10 milliseconds) and, therefore, are good candidates for pulsed power operations, as indicated in FIG. 4. Additionally, a reduction in lifetime with increased excitation in the codoped sample is evident from curve 54. The singly doped holmium curve 52 showed purely exponential decay and no measurable lifetime reduction. This is strong evidence that upconversion losses due to direct interaction among Ho $^5I_7$ ions are very small compared to losses due to the interactions of Tm $^3F_4$ and Ho $^5I_7$ ions. While upconversion rates depend strongly on ion density and excitation level, the results indicate that upconversion would not significantly impact laser performance in comparably doped Ho:YAG lasers. Also, the lack of strong nonradiative loss mechanism suggests that the thermal loading in the quasi-two level laser of the invention 4%-5% quantum defect limit.

Turning to a model of the quasi-two level laser of the invention, in order to determine the steady state small signal gain some assumptions must be made and in this case, a single pump transition and a Boltzmann thermal equilibrium among the Stark components of the Ho $^5I_7$ and Ho $^5I_8$ levels are assumed. The thermal occupation faction of any Stark level is:

$$f_z = \frac{\exp\left[\frac{-\Delta E_z}{kT}\right]}{\sum_i^{StarkLevels} \exp\left[\frac{-\Delta E_i}{kT}\right]}$$

The rate equation describing the population inversion, in the absence of stimulated emission, can be written as:

$$\frac{d[\Delta n]}{dt} = \frac{[\Delta n_{ss} - \Delta n]}{\tau}$$

where the steady state population and the pump saturation reduced lifetime are:

$$\Delta n_{ss} = N_{Ho} \cdot \frac{(f_{1P}f_{2L} - f_{2P}f_{1L}) \cdot I - f_{1L} \cdot I_p}{[(f_{1P} + f_{2P}) \cdot I + I_p]}$$

and $$\tau = \frac{\tau_0 \cdot I_p}{[(f_{1P} + f_{2P}) \cdot I + I_p]}$$

in terms of the thermal occupancy factors, f's, the fluorescence time, $\tau_0$, and the saturation intensity for the pump, $$I_p = \frac{h\nu_p}{\sigma_p \tau_0}.$$

For a constant pump intensity, I, the population inversion simply grows as:

$$\Delta n(t) = \Delta n_{ss} \cdot \left[1 - \exp\left(\frac{-t}{\tau}\right)\right]$$

Therefore, the steady state small signal gain coefficient resulting from the above equations may be written as:

$$g_{ss} = \alpha_L \cdot \left(\frac{\tau}{\tau_0}\right) \cdot \left[(e^{\frac{h\Delta\nu}{kT}} - 1) \cdot f_{2P} \cdot \frac{I}{I_p} - 1\right]$$

where $\alpha_L$ is the unsaturated absorption coefficient at the laser transition. It is also possible to show that the highest steady state laser efficiency that can be achieved is:

$$\eta_{ss} = \left(\frac{\nu_L}{\nu_P}\right) \cdot \left[\frac{f_{2L}}{(f_{1L} + f_{2L})}\right] \cdot (1 - e^{\frac{-h\Delta\nu}{kT}}) \cdot \left(1 - \frac{I_T}{I}\right)$$

From the last two equations it may be seen that the small energy difference between the pump and laser photons, hΔν, impacts the laser performance. The intensity required to achieve minimal laser threshold varies inversely as $$[\exp^{(\frac{h\Delta\nu}{kT})} - 1].$$

To avoid excessive thresholds or low efficiency as a result of pump saturation, the equation $h\Delta\nu \geq kT$ must be satisfied. For the quasi-two level holmium laser 10, described above, this requirement is satisfied for temperatures below 360K. At room temperature, laser 10 has a predicted minimum threshold intensity, $I_T$, of 160 W/cm$^2$ and a maximum possible efficiency of 74% if the Ho:YAG laser is pumped at a frequency of 1.91 μm, as shown by 46 in FIG. 2.

Figure 5:
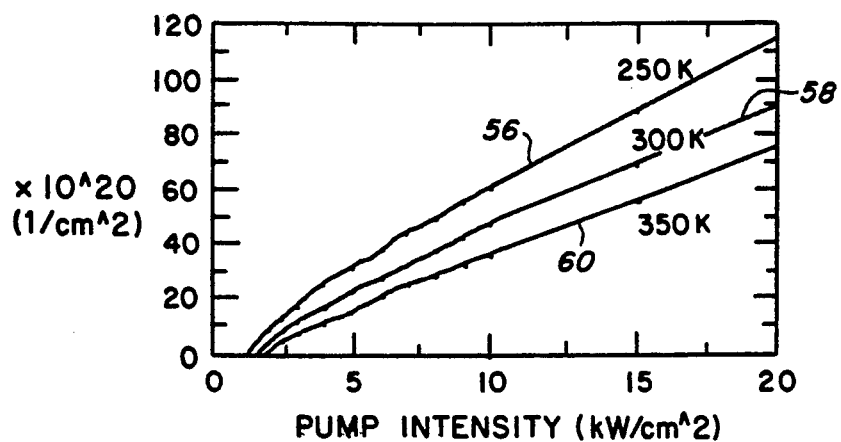
FIG. 5 is a graph of pump intensity versus crystal density for the laser device of FIG. 1.

Turning now to FIG. 5, the calculated optimal density length products for the quasi-two level laser are illustrated, i.e., the calculated holmium density product which gives the highest total gain at 2.120 μm for CW longitudinal pumping at 2.019 μm. The calculations assume room temperature values of the absorption and emission cross-sections. FIG. 5 shows that the optimal crystal density varies weakly with temperature. Curves 56, 58 and 60 represent a plot of pump intensity versus density at temperatures of 250K, 300K and 350K respectively.

Figure 6:
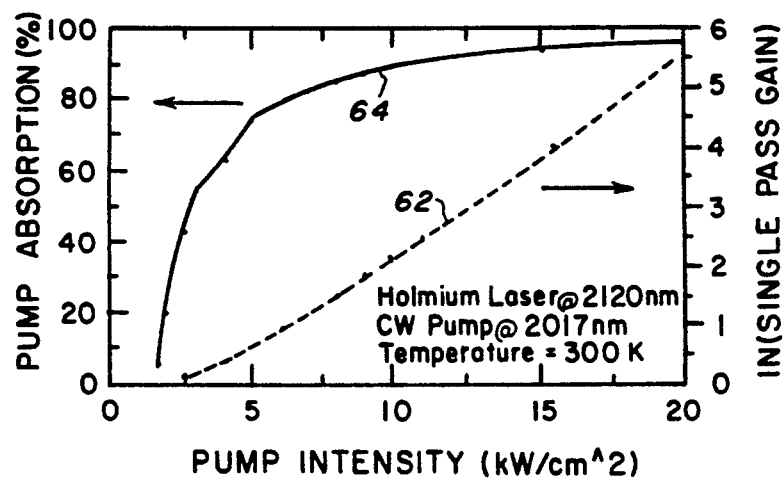
FIG. 6 is a graph of pump absorption and single pass gain for the laser device of FIG. 1.

Turning now to FIG. 6, there are shown the calculated pump absorption and single pass gain for the quasi-two level laser of the invention and in particular, for a CW longitudinal pumped Ho:YAG laser. The optimal crystal density length products illustrated in FIG. 5 are assumed at each pump intensity. In FIG. 6, curve 62 represents the gain and curve 64 represents the pump absorption. As can be seen from FIG. 6, a pump absorption of greater than 80% is achievable with a pump intensity which is greater than 7 kW/cm$^2$. At this pump intensity, an optimal Ho:YAG laser has an $\alpha L = 4$ at the pump wavelength. This clearly illustrates the importance of saturation in a quasi-two level laser.

Figure 7:
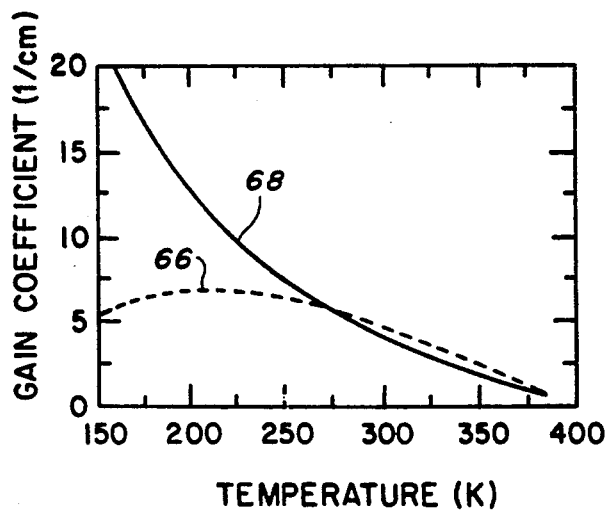
FIG. 7 is a graph of temperature versus gain for the laser device of FIG. 1.

Referring to FIG. 7, the temperature dependance of the gain coefficient is illustrated for a Ho:YAG crystal optimized for 300K. In particular, curve 66 illustrates the temperature dependency for a Ho:YAG crystal having a holmium doping density of $4 \times 10^{20}$ cm$^{-3}$ while curve 68 illustrates the temperature dependency for a Ho,Tm:YAG laser having respective doping densities of $5.0 \times 10^{19}$ cm$^{-3}$ and $8.0 \times 10^{20}$ cm$^{-3}$ for holmium and thulium, respectively. The pump intensities for both cases were adjusted for a gain coefficient of 5%/cm at room temperature. These curves indicate that gain in the 2.0 μm pumped holmium laser (Ho:YAG) is much less sensitive to temperature variations than in the thulium sensitized laser (Ho,Tm:YAG). This insensitivity is due in part, to, the fact that in the pumped system, the temperature dependence of the absorption at the laser transition is largely offset by comparable dependence for the pump absorption.

Laser thresholds in Tm sensitized Ho materials (Ho,Tm:YAG) of the prior art are usually high and largely determined by the Ho density. The energy balance between Tm and Ho ions requires that these dopant concentration be kept in relative proportions (15:1 is standard). As a result, sensitization via cross relaxation quenching of the $^3H_4$ level in Tm restricts the minimal Ho concentration. Using direct pumping as provided in accordance with the present invention, instead of sensitization, the Ho concentration can be reduced for lower laser thresholds. In addition, host materials 12 for the Ho ions do not need to be compatible with Tm or Cr sensitization. In general, the relaxation of restrictions on Ho ion concentrations and host materials 12 should allow more system design flexibility.

The directly pumped holmium (Ho) quasi-two level laser of the invention provides the advantages of reducing the thermal loading of the laser medium, reducing upconversion losses, increasing short pulse extraction efficiency, reducing the sensitivity of gain to temperature, and providing increased flexibility in the selection of Ho concentrations and Ho materials.

As is evident from the foregoing, this invention concerns quasi-two level laser systems that utilize the Thulium $^3F_4$ to $^3H_6$ transition to optically pump the Holmium $^5I_7$ level. While the foregoing description of the quasi-two level laser is that of a longitudinal pumping technique, it should be understood that transverse, intracavity, two-photon, up-conversion and ground state depletion pumping techniques can also be used. Additionally, any lasing host material can be used for these rare earth ions. Further, multiple active ion materials, sensitized materials and level quenched materials can be employed in so far as they utilize the above disclosed pumping technique. An obvious extension of this technique would be the direct pumping of any other quasi-two level laser medium with a discrete, tuned or frequency converted laser system.

Although the present invention has been described to specific exemplary embodiments thereof, it will be understood by those skilled in the art that variations and modifications can be effected in these exemplary embodiments without departing from the scope and spirit of the invention.

What is claimed and desired to be secured by Letters Patent of the United States is:

1. A laser system comprising:
   a holmium laser having an output laser emission at a wavelength of about 2.1 μm; and
   a pumping laser having an output emission at a wavelength of about 2 μm for directly pumping said holmium laser.

2. The laser system of claim 1 wherein:
   said pumping laser comprises a 2 μm laser diode.

3. The laser system of claim 1 wherein:
   said pumping laser comprises a 2 μm thulium laser.

4. The laser system of claim 1 wherein:
   said pumping laser comprises a crystal containing thulium.

5. The laser system of claim 4 wherein:
   said pumping laser includes a continuous wave light source for pumping said crystal containing thulium.

6. The laser system of claim 4 wherein:
   said pumping laser includes a pulsed light source for pumping said crystal containing thulium.

7. The laser system of claim 6 wherein:
   said pulsed light source comprises a flashlamp.

8. The laser system of claim 1 wherein:
   said holmium laser comprises a Ho:YAG crystal.

9. The laser system of claim 8 wherein:
   said laser system includes a high Q thulium cavity: and
   said Ho:YAG crystal is disposed inside said high Q thulium cavity.

10. A laser system comprising:
    a holmium laser having a $^5I_7$ level; and
    a thulium laser having a $^3F_4$ to $^3H_6$ transition for providing direct optical pumping of the holmium $^5I_7$ level of the holmium laser from the $^3F_4$ to $^3H_6$ transition of the thulium laser.

11. The laser system of claim 10 wherein:
said holmium laser has substantially a 2.1 μm laser wavelength; and
said thulium laser has substantially a 2 μm laser wavelength.

12. The laser system of claim 10 wherein:
said thulium laser comprises a Tm:YAG laser.

13. The laser system of claim 10 wherein:
said thulium laser comprises a Cr,Tm:YAG laser.

14. The laser system of claim 10 wherein:
said holmium laser comprises a Ho:YAG laser.

15. A solid state laser device comprising:
a holmium laser having a host material doped with an amount of holmium ions sufficient to produce an output laser emission at a wavelength of approximately 2.1 μm when said holmium ions are optically pumped at a wavelength of approximately 2 μm, said host material being doped with holmium ions at a concentration of approximately $5 \times 10^{119}$ cm$^{-3}$; and
pump source means for directly optically pumping said holmium laser at a wavelength of approximately 2 μm, to provide said output laser emission at a wavelength of approximately 2.1 μm.

16. The laser device of claim 15 wherein said pump source means comprises:
a pumping light source; and
a 2 μm laser pumped by said pumping light source.

17. The laser device of claim 16 wherein:
said pumping light source comprises a flashlamp.

18. The laser device of claim 15 wherein:
said 2 μm laser has a host material doped with thulium at a concentration of approximately $8 \times 10^{20}$ cm$^{-3}$.

19. The laser device of claim 18 wherein:
said 2 μm laser is further doped with chromium at a concentration of approximately $7 \times 10^{19}$ cm$^{-3}$.

20. A solid state laser device comprising:
a holmium laser comprising a first host material doped with an amount of holmium ions sufficient to produce an output laser emission at a wavelength of about 2.1 μm when said holmium laser is optically pumped at a wavelength of about 2 μm, said first host material being doped with holmium at a concentration of approximately $5 \times 10^{19}$ cm$^{-3}$; and
laser pumping means for directly optically pumping said holmium laser with a laser emission at a wavelength of about 2 μm to cause said holmium laser to produce said output laser emission, said laser pumping means comprising a pulsed light pump source and a laser operating at a wavelength of about 2 μm and pumped by said pulsed light pump source, said about 2 μm laser having a second host material doped with thulium at a concentration of approximately $8 \times 10^{20}$ cm$^{-3}$ and with chromium at concentration of approximately $7 \times 10^{19}$ cm$^{-3}$.

21. The solid state laser device of claim 20 wherein:
each of said first and second host materials is selected from the group consisting of glass, YAG, YSAG, YSGG, YGG, GGG, GSAG, GSGG, LLGG, YLF, YAlO$_3$, YSiO$_5$ and mixtures thereof.

* * * * *